United States Patent
Green

(10) Patent No.: US 9,986,752 B2
(45) Date of Patent: Jun. 5, 2018

(54) BASE MEDICINAL LIQUID FORMULATION FOR SUPPORTING THE SPECIFIC HOMEOSTATIC ACID-BASE BALANCE OF LIVING TISSUE

(76) Inventor: Lawrence M. Green, Pinecrest, FL (US)

( * ) Notice: Subject to any disclaimer, the term of this patent is extended or adjusted under 35 U.S.C. 154(b) by 966 days.

(21) Appl. No.: 13/561,931

(22) Filed: Jul. 30, 2012

(65) Prior Publication Data

US 2012/0328738 A1    Dec. 27, 2012

Related U.S. Application Data

(63) Continuation-in-part of application No. 12/126,785, filed on May 23, 2008, now abandoned.

(51) Int. Cl.
| | | |
|---|---|---|
| *A23L 2/52* | (2006.01) | |
| *A23L 1/304* | (2006.01) | |
| *A23L 33/16* | (2016.01) | |

(52) U.S. Cl.
CPC .............. *A23L 2/52* (2013.01); *A23L 33/16* (2016.08)

(58) Field of Classification Search
None
See application file for complete search history.

(56) References Cited

U.S. PATENT DOCUMENTS 5,306,511 A * 4/1994 Whang .............. A23L 2/52
426/66
2005/0287227 A1* 12/2005 Pero ................. A61K 31/015
424/641

FOREIGN PATENT DOCUMENTS

EP        0514451 B1 * 11/1992 ........... A61K 38/063

* cited by examiner

*Primary Examiner* — Bethany P Barham
*Assistant Examiner* — Dominic Lazaro

(57) ABSTRACT

This invention is a concentrated alkali buffer+minerals additive within a range of concentrated alkali buffer+mineral formulations to be added to municipal tap waters, commercial non-carbonated bottled waters or natural spring waters. The additive increases the pH value of these consumable drinking waters and delivers the essential and indispensable minerals of the concentrated alkali buffer+minerals formulations in order to influence alterations in the anion gap and for blood pH balancing in the alkaline range when bicarbonate production is diminished or endogenous acid production (EAP) is overwhelming and the body is using minerals sacrificed from physiologically essential repositories in order to compensate for pH swings caused by EAP or other factors.

33 Claims, No Drawings

BASE MEDICINAL LIQUID FORMULATION FOR SUPPORTING THE SPECIFIC HOMEOSTATIC ACID-BASE BALANCE OF LIVING TISSUE

FIELD OF THE DISCLOSURE

This invention relates to an alkali buffer+minerals supplement additive to achieve an alkaline drinking water for delivering essential minerals to the human body when added to commercial non-carbonated bottled waters, natural spring waters or municipal tap water. This alkali buffer+minerals supplement additive, in a range of formulations blended from active ingredients consisting of: potassium hydroxide and sodium hydroxide with magnesium carbonate hydroxide and zinc carbonate, added to USP water, when dispensed from a dose-appropriate non-reactive container into 8-10 ounces of commercial non-carbonated bottled waters, natural spring waters or municipal tap water or on a larger scale from non-reactive bulk storage containers, will deliver essential minerals to the human body and provide support for the maintenance of arterial blood pH in the healthy pH range (7.37-7.43 pH) by influencing the body to produce additional bio-available bicarbonate.

FIELD OF THE INVENTION

The field of the present invention relates broadly to supporting the optimal health of human beings: minute fluctuations in arterial blood pH are clinically significant and can be mitigated and a resulting chronic low-grade metabolic acidosis can be reversed with intervention by means of regular consumption of the alkali buffer+minerals supplement additive of this invention in a range of formulations.

The causes of metabolic acidosis include increased consumption or generation of organic acids, as well as either insufficient production of bicarbonate, or renal and/or gastro-intestinal loss of bicarbonate, such as that seen in renal disease, diarrhœa, pancreatic drainage and biliary fistula. Causes of renal tubular acidosis include Sjögren's syndrome, systemic lupus erythematosus, urinary tract obstruction, fever, aldosterone deficiency and glucocorticoid administration. Many of these medical conditions are typically associated with overt laboratory abnormalities; either a frank acidæmia, a decrease in plasma bicarbonate, or an increase in the anion gap.

In comparison, diet-induced 'low-grade' metabolic acidosis has only very small decreases in blood pH and plasma bicarbonate within the range considered to be normal. Within that range, this means that the system equilibrates nearer the lower end of normal rather than the higher end of normal. But, if the duration of the acidosis is prolonged or chronically present, even a low degree of acidosis becomes significant. This less severe but more chronic 'low-grade' acidosis is thought to be brought about primarily by two factors: advancing age with a consequent decline in renal function, and diet, which may promote acidosis by both its net acid load, as well as its sodium chloride content. With age, the severity of diet-dependent acidosis increases independently of the diet, most likely due to a decline in kidney functional capacity with age. Renal insufficiency contributes to a metabolic acidosis by reducing conservation of filtered bicarbonate and excretion of acid.

Diet's contribution to an acidotic state is now well documented. See e.g., Pizzorno, Joseph, Frassetto, Lynda A., Katzinger, Joseph, Diet-induced acidosis: is it real and clinically relevant? *British Journal of Nutrition*, 103:1187-1188 (2010).

Specifically, the invention pertains to a concentrated alkali buffer+minerals supplement additive in a range of formulations, contained in non-reactive, easy to use, convenient, and readily available dispensers, that are added to commercial non-carbonated bottled waters, natural spring waters and municipal tap water (in an 8-10 ounce glass or its equivalent).

More specifically, the invention relates to a concentrated alkali buffer+minerals supplement additive in a range of formulations formed by mixing potassium hydroxide (KOH), sodium hydroxide (NaOH), magnesium carbonate hydroxide $(MgCO_3)_4 \cdot Mg(OH)_2 \cdot 5H_2O$ and zinc carbonate $(ZnCO_3)$ in amounts selected within a specific range. The additive formulations are diluted in commercial non-carbonated bottled waters, natural spring waters or municipal tap water in order to increase the pH value of the final drinking waters to a range of approximately 9.5 to 10.5 on the pH scale.

Arterial blood pH balancing in the narrow healthy alkaline range of 7.37 to 7.43 pH is indispensable to human health. When bicarbonate production is diminished or endogenous acid production overwhelms the pathophysiological metabolic rate, the body resorbs essential alkaline minerals from other sites in the human body (sacrificial anodes) where they are repositoried and sacrifices them to compensate for pH swings caused by endogenous acid production or bicarbonate production deficiency or other factors. These swings can occur in days, hours or milliseconds. Thus, relatively small alterations in plasma K, NaCl, Mg concentrations may have major clinical manifestations.

Magnesium (Mg), an alkaline mineral, is present in the invention in trace amounts.

Zinc Carbonate $(ZnCO_3)$ is present in the invention in trace amounts.

DESCRIPTION OF PRIOR ART

It is known that sodium is in every food and food product that is consumed by humans. That is, and has been, a reality for more than 300 hundred years and, looking retrospectively, it could be said that it is true for thousands of years. The average amount of sodium and potassium minerals in a 69.7 kg (154 lb.) adult man is 63 grams and 150 grams, respectively. Since the atomic weights of sodium and potassium are 23 and 39 respectively, the ratio of the number of atoms to the average normal body amounts of these minerals is 63/23 for sodium and 150/39 for potassium. These ratios translate into 41.6% sodium atoms to 58.4% potassium atoms. However, presently in the average diet, unless one is conscientiously avoiding sodium, there are more foods that contain sodium than potassium. A device in a closely-related field, an electrically powered water ionizer machine, was originally developed over sixty years ago in Japan. Water ionizers have been introduced in the United States and have achieved acceptance within the last several decades. The chief purpose of these ionizer machines is to create alkaline drinking water from regular bottled or tap waters. Accordingly, a ready demand for alkaline drinking water, recognized as being beneficial for some individuals, has developed in the health field.

Water ionizer machines do not incorporate any minerals into water (regular tap water, for example) that is placed in the machine. Instead, the ionizer has positive and negative electrodes that split the tap water's alkaline minerals to one side for use and the tap water's acidic minerals to another side for discard. The pH in the final drinking water produced by the machine (output), depending on the mineral content in the tap water supplied to it, is an alkaline drinking water of increased oxygen having a pH in the range of approximately 8.5-10.5 on the pH scale. Ionized water from such machines is essentially acid-free because the ionization process removes the acid minerals from the machine's drinking water output. The acid water from such machines is discarded or finds use by florists for preserving cut flower shelf life. If the original water supplied to the ionizer is lacking alkaline minerals, the pH of the alkaline water produced may not reach the desired range.

Water ionizers, although commercially successful, suffer from several limitations. For example, ionizer machines are expensive, ranging in price from about $600.00-$2,000.00 each. Water ionizers are relatively bulky machines and are inconvenient for travel. Moreover, water ionizers require an available source of water, electricity and a discharge point for the acidic water. Ionizer machines have high maintenance expenses. The filters saturate at different efficacy points based on water source and may produce hazardous waste materials (filters) that may have residual expenses to manage also, depending on input water source.

Despite their shortcomings, water ionizers clearly have established a recognizable demand for alkaline water. An increasing segment of the consuming public is accustomed to relying on a readily available supply of ionizer-produced alkaline water. What water ionizers cannot do, however, is to provide a simple, effective power-free way to convert commercial non-carbonated bottled waters, natural spring waters or municipal tap water into alkaline water that consumers are increasingly demanding.

This invention overcomes uninviting characteristics of water ionizer machines by providing a simple, ready-to-use, concentrated additive in a range of formulations that easily dilute in commercial non-carbonated bottled waters, natural spring waters or municipal tap water and produce a final drinking water with a pH value in the range of approximately 9.5-10.5 pH in any setting. For personal consumption, four drops of the concentrated alkali buffer+minerals supplement additive in a range of formulations of this invention, added to an 8-10 ounce glass/container of commercial non-carbonated bottled waters, natural spring waters or municipal tap water, converts that water into an alkaline water with mineral supplements.

SUMMARY OF THE INVENTION

This invention provides a concentrated alkali buffer+minerals supplement additive in a range of formulations formed by blending potassium hydroxide (KOH), sodium hydroxide (NaOH), magnesium carbonate hydroxide $(MgCO_3)_4.Mg(OH)_2.5H_2O$ and zinc carbonate $ZnCO_3$ to enhance bio-absorption. By using hydroxides and zinc carbonate embodied in this invention, the pH can be further controlled in the range of formulations. More particularly, the invention combines one part concentrated alkali buffer+minerals supplement additive in a range of formulations diluted with nine parts USP water, packaged in dose-appropriate (0.01 fluid ounces [0.4 mL]) non-reactive dispensers or containers of larger volumes with the same identical additives in a range of formulations.

The concentrated alkali buffer+minerals supplement additive in a range of formulations of this invention is further characterized by a diluted mixture of one part additive to nine parts USP water, wherein the active ingredients consist of KOH in the range of 0.9% to 7.6%, NaOH in the range of 0.5% to 4.7%, $(MgCO_3)_4.Mg(OH)_2.5H_2O$ in the range of 0.27% to 0.33% and $ZnCO_3$ in the range of 0.18% to 0.22%. More particularly, the invention combines one part active ingredients concentrate diluted with nine parts USP water packaged in dose-appropriate (0.01 fluid ounces [0.4 mL]) non-reactive dispensers or containers of larger volumes with the same identical range of formulations.

Packaging in dose-appropriate (0.01 fluid ounces [0.4 mL]) non-reactive dispensers or containers of larger volumes with the same identical range of formulations permits the user to conveniently dispense an appropriate dose of the concentrated alkali buffer+minerals supplement additive of this invention in a range of formulations into an ordinary 8-10 ounce glass or container of commercial non-carbonated bottled waters, natural spring waters or municipal tap water.

OBJECT OF THE INVENTION

It is an object of the present invention to provide a concentrated alkali buffer+minerals supplement additive in a range of formulations, for dilution into commercial non-carbonated bottled waters, natural spring waters and municipal tap water, to produce a final drinking water having an increased pH value of approximately 9.5-10.5 pH on the pH scale, as a more convenient source of alkaline water.

It is another object of this invention to provide a concentrated alkali buffer+minerals supplement additive in a range of formulations, for dilution into commercial non-carbonated bottled waters, natural spring waters and municipal tap water, to produce a final drinking water having an increased pH value of approximately 9.5-10.5 pH on the pH scale, as a convenient alternative to reliance on complicated, expensive water ionizers for sources of alkaline water wherein water ionizer machines carry the added burden of requiring electricity and drainage.

It is still another object of this invention to provide a concentrated alkali buffer+minerals supplement additive in a range of formulations for dilution in commercial non-carbonated bottled waters, natural spring waters and municipal tap water, in order to increase the pH value of the final drinking water wherein the concentrated additive in a range of formulations is prepared by blending selected amounts of the active ingredients: potassium hydroxide, sodium hydroxide, magnesium carbonate hydroxide and zinc carbonate in USP water in a ratio of one (1) part active ingredient(s) to nine (9) parts $H_2O$ (USP) water.

DESCRIPTION OF PREFERRED EMBODIMENT AND BEST MODE OF THE INVENTION

The purpose of this invention is to supply an alkali buffer+minerals supplement additive in a range of formulations in order to convert commercial non-carbonated bottled waters, natural spring waters and municipal tap waters, customarily having a pH value of approximately 7.0, into consumable final drinking waters having a pH value of approximately 9.5-10.5 pH on the pH scale. The alkali buffer+minerals supplement additive of this invention in a range of formulations neutralizes and influences the body to mitigate excessive endogenous acid. Consumption of commercial non-carbonated bottled waters, natural spring waters and municipal tap waters containing the alkali buffer+mineral supplement additive of this invention in a range of formulations supports healthy human metabolic physiology by reducing acid in the arterial blood supply and naturally compensating for disturbances in arterial blood pH within the established healthy range of 7.37-7.43 pH [The Merck Manual of Diagnosis and Therapy, 18$^{th}$ Edition, p. 1263 (2006)].

The new concentrated alkali buffer+minerals supplement additive in a range of formulations of this invention supports arterial blood pH by employing the body's natural mechanisms; the stomach is naturally more acidic, approximately 2.0 to 4.0 on the pH scale. When said additive is diluted in commercial non-carbonated bottled waters, natural spring waters or municipal tap waters and consumed orally (9.5 to 10.5 pH), the stomach will react by producing hydrochloric acid (parietal cells). That action will correspondingly trigger a reaction for the same cells and the pancreas to produce additional bio-available bicarbonate. The additional bicarbonate ($HCO_3^-$) gets absorbed through the intestines and further absorbed into the intestines and into the intestinal wall (endothelium) and further, into the arterial blood.

The new concentrated alkali buffer+minerals supplement additive in a range of formulations of this invention consisting of: $H_2O$ (USP) water and the following active ingredients: KOH (potassium hydroxide), NaOH (sodium hydroxide), $(MgCO_3)_4 \cdot Mg(OH)_2 \cdot 5H_2O$ (magnesium carbonate hydroxide) and $ZnCO_3$ (zinc carbonate), wherein said new concentrated alkali buffer+minerals supplement additive has a ratio of one (1) part active ingredient(s) to nine (9) parts $H_2O$ (USP) water and is approximately 12.5 on the pH scale.

The new concentrated alkali buffer+minerals supplement additive wherein said active ingredient of the formula KOH is present in the range of 0.9% to 7.6%, said active ingredient NaOH is present in the range of 0.5% to 4.7%, said active ingredient $(MgCO_3)_4 \cdot Mg(OH)_2 \cdot 5H_2O$ is present in the range of 0.27% to 0.33%, and said active ingredient $ZnCO_3$ is present in the range of 0.18% to 0.22%, which, when added in a ratio of one (1) part active ingredient(s) to nine (9) parts $H_2O$ (USP) water is approximately 12.5 on the pH scale.

The new concentrated alkali buffer+minerals supplement additive in a range of formulations when added to commercial non-carbonated bottled waters or natural spring waters, increases the pH value of said commercial non-carbonated bottled waters or natural spring waters as a final drinking water to within a range of approximately 9.5-10.5 on the pH scale.

The new concentrated alkali buffer+minerals supplement additive in a range of formulations which, when added to commercial non-carbonated bottled waters or natural spring waters, increases the pH value of said commercial non-carbonated bottled waters or natural spring waters as a final drinking water to within a range of approximately 9.5-10.5 on the pH scale.

The new concentrated alkali mineral buffer+minerals supplement additive in a range of formulations which, when added to municipal tap water, increases the pH value of said municipal tap water as a final drinking water to within a range of approximately 9.5-10.5 on the pH scale.

The final drinking water with the formulation of the invention which, when consumed orally, raises the pH level in the stomach of the human body that has consumed it.

The final drinking water of the invention which raises the pH level in the stomach of the human body that orally consumes it, will also influence the stomach of that human body to produce additional hydrochloric acid.

The final drinking water of the invention when consumed which influences the stomach of the human body that orally when consumed, which influences it to produce additional hydrochloric acid, correspondingly influences the stomach to produce additional bio-available bicarbonate, by reason of the human body's natural metabolic mechanisms, which said bio-available bicarbonate travels to the intestines.

The additional bio-available bicarbonate that travels to the intestines as a consequence of the stomach correspondingly having produced hydrochloric acid in response to the introduction into the stomach of the final drinking water of the invention is absorbed into the arterial blood supply from the intestines of the human body that consumed the final drinking water containing the alkali buffer+minerals supplement additive in a range of formulations.

The additional bio-available bicarbonate introduced into the arterial blood supply of a human body that consumes the final drinking water of this invention, as a consequence of the stomach having produced hydrochloric acid, supports healthy human metabolic physiology by reducing acid in the arterial blood and naturally compensating for disturbances in arterial blood pH within the established healthy range of 7.37-7.43 pH.

The invention claimed is:

1. A concentrated alkali buffer and minerals additive to be added to municipal tap waters, commercial non-carbonated bottled waters, or natural spring waters, in order to increase pH value, and deliver essential minerals, wherein said concentrated alkali buffer and minerals additive consists of: one part [10%] active ingredients consisting of potassium hydroxide [KOH], sodium hydroxide [NaOH], magnesium carbonate hydroxide [$(MgCO_3)_4 \cdot Mg(OH)_2 \cdot 5H_2O$] and zinc carbonate [$ZnCO_3$]; and nine parts [90%] United States Pharmacopeia (USP) water; wherein said concentrated alkali buffer and minerals additive is formulated for: influencing alterations in the anion gap; blood pH balancing in the alkaline range when bicarbonate production is diminished; pH swings caused by endogenous acid production (EAP) overwhelming the body; and/or when the body is using alkaline minerals sacrificed from physiological repositorties.

2. The concentrated alkali buffer and minerals additive of claim 1, wherein said active ingredients are formulated in compositions ranging from 9.0% potassium hydroxide, 0.5% sodium hydroxide, 0.3% magnesium carbonate hydroxide and 0.2% zinc carbonate to 4.8% potassium hydroxide, 4.7% sodium hydroxide, 0.3% magnesium carbonate hydroxide and 0.2% zinc carbonate, said range of compositions being flexible to a plus or minus 10% variable of the absolute values to meet medical conditions of the consumer that require this range to be altered, and further, said range of compositions being flexible to allow for the invention to be produced in larger quantities.

3. The concentrated alkali buffer and minerals additive of claim 1, wherein said active ingredients are formulated in compositions ranging from 7.6% potassium hydroxide, 1.9% sodium hydroxide, 0.3% magnesium carbonate hydroxide and 0.2% zinc carbonate to 6.6% potassium hydroxide, 2.9% sodium hydroxide, 0.3% magnesium carbonate hydroxide and 0.2% zinc carbonate, said range of compositions being flexible to a plus or minus 10% variable of the absolute values to meet medical conditions of the consumer that require this range to be altered, and further, said range of compositions being flexible to allow for the invention to be produced in larger quantities.

4. A concentrated alkali buffer and minerals additive to be added to consumable drinking waters selected from the group consisting of municipal tap waters, commercial non-carbonated bottled waters or natural spring waters, wherein said concentrated alkali buffer and minerals additive consists of: active ingredients consisting of potassium hydroxide

[KOH], sodium hydroxide [NaOH], magnesium carbonate hydroxide [(MgCO$_3$)$_4$.Mg(OH)$_2$.5H$_2$O], and zinc carbonate [ZnCO$_3$]; and USP water; wherein said concentrated alkali buffer and minerals additive is formulated to increase the alkalinity of said consumable drinking waters to an increased pH value of approximately 9.5 pH to 10.5 pH.

5. The concentrated alkali buffer and minerals additive for the consumable drinking waters of claim 4, wherein one part [10%] active ingredients consists of potassium hydroxide [KOH], sodium hydroxide [NaOH], magnesium carbonate hydroxide [(MgCO$_3$)$_4$.Mg(OH)$_2$.5H$_2$O] and zinc carbonate [ZnCO$_3$], is added to nine parts [90%] USP water, and said active ingredients are formulated in compositions ranging from 9.0% potassium hydroxide, 0.5% sodium hydroxide, 0.3% magnesium carbonate hydroxide and 0.2% zinc carbonate to 4.8% potassium hydroxide, 4.7% sodium hydroxide, 0.3% magnesium carbonate hydroxide and 0.2% zinc carbonate, said range of compositions being flexible to a plus or minus 10% variable of the absolute values to meet medical conditions of the consumer that require this range to be altered, and further, said range of compositions being flexible to allow for the invention to be produced in larger quantities.

6. The concentrated alkali buffer and minerals additive for the consumable drinking waters of claim 4, wherein one part [10%] active ingredients consists of potassium hydroxide [KOH], sodium hydroxide [NaOH], magnesium carbonate hydroxide [(MgCO$_3$)$_4$.Mg(OH)$_2$.5H$_2$O] and zinc carbonate [ZnCO$_3$], is added to nine parts [90%] USP water, and said active ingredients are formulated in compositions ranging from 7.6% potassium hydroxide, 1.9% sodium hydroxide, 0.3% magnesium carbonate hydroxide and 0.2% zinc carbonate to 6.6% potassium hydroxide, 2.9% sodium hydroxide, 0.3% magnesium carbonate hydroxide and 0.2% zinc carbonate, said range of compositions being flexible to a plus or minus 10% variable of the absolute values to meet medical conditions of the consumer that require this range to be altered, and further, said range of compositions being flexible to allow for the invention to be produced in larger quantities.

7. The concentrated alkali buffer and minerals additive for the consumable drinking waters of claim 4, wherein said consumable drinking waters are converted into a consumable alkaline minerals final drinking water by the addition thereto of said alkali buffer and minerals additive.

8. The concentrated alkali buffer and minerals additive for the consumable drinking waters of claim 4, wherein said consumable drinking waters have been processed in an ionizer machine, and the pH of said consumable drinking waters thus processed are further raised by the addition of said concentrated alkali buffer and minerals additive to an increased pH value of approximately 9.5 pH to 10.5 pH.

9. A method of achieving a consumable alkaline minerals final drinking water with an increased pH value of approximately 9.5 pH to 10.5 pH comprising the addition of a concentrated alkali buffer and minerals additive to a consumable drinking water in order to create a homogeneous mixture of consumable alkaline minerals in the final drinking water, wherein the concentrated alkali buffer and minerals additive consist of potassium hydroxide [KOH], sodium hydroxide [NaOH], magnesium carbonate hydroxide [(MgCO$_3$)$_4$.Mg(OH)$_2$.5H$_2$O] and zinc carbonate [ZnCO$_3$] in USP water, wherein the consumable drinking waters are selected from the group consisting of municipal tap waters, commercial non-carbonated bottled waters or natural spring waters.

10. The method of claim 9, wherein the concentrated alkali buffer and minerals additive is formulated in compositions ranging from 9.0% potassium hydroxide, 0.5% sodium hydroxide, 0.3% magnesium carbonate hydroxide and 0.2% zinc carbonate to 4.8% potassium hydroxide, 4.7% sodium hydroxide, 0.3% magnesium carbonate hydroxide and 0.2% zinc carbonate, said range of compositions being flexible to a plus or minus 10% variable of the absolute values to meet medical conditions of the consumer that require this range to be altered.

11. The method of claim 9, wherein the concentrated alkali buffer and minerals additive is formulated in compositions ranging from 7.6% potassium hydroxide, 1.9% sodium hydroxide, 0.3% magnesium carbonate hydroxide and 0.2% zinc carbonate to 6.6% potassium hydroxide, 2.9% sodium hydroxide, 0.3% magnesium carbonate hydroxide and 0.2% zinc carbonate, said range of compositions being flexible to a plus or minus 10% variable of the absolute values to meet medical conditions of the consumer that require this range to be altered.

12. The method of claim 9, wherein a consumable alkaline minerals final drinking water with an increased pH value of approximately 9.5 pH to 10.5 pH is achieved by adding four (4) drops of the concentrated alkali buffer and minerals additive to an 8 to 10 ounce glass of a consumable drinking water.

13. The method of claim 9, wherein the concentrated alkali buffer and minerals additive is bottled in non-reactive containers made of such material as will prevent any foreign agents from leaching into the concentrated alkali buffer and minerals additive.

14. A concentrated alkali buffer and minerals additive, wherein said concentrated alkali buffer and minerals additive consists of: one part [10%] active ingredients consisting of potassium hydroxide [KOH], sodium hydroxide [NaOH], magnesium carbonate hydroxide [(MgCO$_3$)$_4$.Mg(OH)$_2$.5H$_2$O] and zinc carbonate [ZnCO$_3$]; added to nine parts [90%] USP water to achieve an increased pH value of approximately 12.5 pH.

15. The concentrated alkali buffer and minerals additive of claim 14, wherein said active ingredients are formulated in compositions ranging from 0.9% potassium hydroxide, 0.5% sodium hydroxide, 0.27% magnesium carbonate hydroxide and 0.18% zinc carbonate to 7.6% potassium hydroxide, 4.7% sodium hydroxide, 0.33% magnesium carbonate hydroxide and 0.22% zinc carbonate, in order to achieve an increased pH value of approximately 12.5 pH.

16. The concentrated alkali buffer and minerals additive of claim 14, which, when added to commercial non-carbonated bottled waters or natural spring waters, increases the pH value of said commercial non-carbonated bottled waters or natural spring waters in order to obtain a consumable alkaline minerals final drinking water within a range of approximately 9.5 pH to 10.5 pH.

17. The concentrated alkali buffer and minerals additive of claim 15, which, when added to commercial non-carbonated bottled waters or natural spring waters, increases the pH value of said commercial non-carbonated bottled waters or natural spring waters as a consumable alkaline minerals final drinking water to within a range of approximately 9.5 pH to 10.5 pH.

18. The concentrated alkali buffer and minerals additive of claim 14, which, when added to municipal tap water, increases the pH value of said municipal tap water in order to obtain a consumable alkaline minerals final drinking water within a range of approximately 9.5 pH to 10.5 pH.

19. The concentrated alkali buffer and minerals additive of claim 15, which, when added to municipal tap water, increases the pH value of said municipal tap water in order to obtain a consumable alkaline minerals final drinking water to within a range of approximately 9.5 pH to 10.5 pH.

20. The concentrated alkali buffer and minerals additive of claim 16, wherein oral consumption of the obtained consumable alkaline minerals final drinking water raises the pH level in the stomach of the human body that has consumed it.

21. The concentrated alkali buffer and minerals additive of claim 17, wherein oral consumption of the obtained consumable alkaline minerals final drinking water raises the pH level in the stomach of the human body that has consumed it.

22. The concentrated alkali buffer and minerals additive of claim 18, wherein oral consumption of the obtained consumable alkaline minerals final drinking water raises the pH level in the stomach of the human body that has consumed it.

23. The concentrated alkali buffer and minerals additive of claim 19, wherein oral consumption of the obtained consumable alkaline minerals final drinking water raises the pH level in the stomach of the human body that has consumed it.

24. The concentrated alkali buffer and minerals additive of claim 16, wherein oral consumption of the obtained consumable alkaline minerals final drinking water influences the stomach of the human body to produce additional hydrochloric acid.

25. The concentrated alkali buffer and minerals additive of claim 17, wherein oral consumption of the obtained consumable alkaline minerals final drinking water influences the stomach of the human body to produce additional hydrochloric acid.

26. The concentrated alkali buffer and minerals additive of claim 18, wherein oral consumption of the obtained consumable alkaline minerals final drinking water influences the stomach of the human body to produce additional hydrochloric acid.

27. The concentrated alkali buffer and minerals additive of claim 19, wherein oral consumption of the obtained consumable alkaline minerals final drinking water influences the stomach of the human body to produce additional hydrochloric acid.

28. The concentrated alkali buffer and minerals additive of claim 16, wherein oral consumption of the obtained consumable alkaline minerals final drinking water influences the stomach of the human body that orally consumes it to produce additional hydrochloric acid, and correspondingly influences the stomach to produce additional bioavailable bicarbonate by natural metabolic mechanisms, wherein said bio-available bicarbonate travels to the intestines.

29. The concentrated alkali buffer and minerals additive of claim 17, wherein oral consumption of the obtained consumable alkaline minerals final drinking water influences the stomach of the human body that orally consumes it to produce additional hydrochloric acid, and correspondingly influences the stomach to produce additional bioavailable bicarbonate by natural metabolic mechanisms, wherein said bio-available bicarbonate travels to the intestines.

30. The concentrated alkali buffer and minerals additive of claim 18, wherein oral consumption of the obtained consumable alkaline minerals final drinking water influences the stomach of the human body that orally consumes it to produce additional hydrochloric acid, and correspondingly influences the stomach to produce additional bioavailable bicarbonate by natural metabolic mechanisms, wherein said bio-available bicarbonate travels to the intestines.

31. The concentrated alkali buffer and minerals additive of claim 19, wherein oral consumption of the obtained consumable alkaline minerals final drinking water influences the stomach of the human body that orally consumes it to produce additional hydrochloric acid, and correspondingly influences the stomach to produce additional bioavailable bicarbonate by natural metabolic mechanisms, wherein said bio-available bicarbonate travels to the intestines.

32. The concentrated alkali buffer and minerals additive of claim 17, wherein oral consumption of the obtained consumable alkaline minerals final drinking water results in additional bio-available bicarbonate absorbed into the arterial blood supply from the intestines, thereby supporting healthy human metabolic physiology by reducing endogenous acid in arterial blood, compensating for disturbances in arterial blood pH, and influencing alterations in the anion gap.

33. The concentrated alkali buffer and minerals additive of claim 18, wherein oral consumption of the obtained consumable alkaline minerals final drinking water results in additional bio-available bicarbonate absorbed into the arterial blood supply from the intestines, thereby supporting healthy human metabolic physiology by reducing endogenous acid in arterial blood, compensating for disturbances in arterial blood pH, and influencing alterations in the anion gap.

\* \* \* \* \*